(12) United States Patent
Petrovic et al.

(10) Patent No.: US 7,450,122 B2
(45) Date of Patent: Nov. 11, 2008

(54) VOLUMETRIC HAIR RENDERING

(75) Inventors: Lena Petrovic, Oakland, CA (US); John R. Anderson, San Anselmo, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 11/072,073

(22) Filed: Mar. 3, 2005

(65) Prior Publication Data
US 2005/0210994 A1    Sep. 29, 2005

Related U.S. Application Data

(60) Provisional application No. 60/628,645, filed on Nov. 16, 2004, provisional application No. 60/556,551, filed on Mar. 25, 2004, provisional application No. 60/556,532, filed on Mar. 25, 2004.

(51) Int. Cl.
G06T 15/50    (2006.01)
G06T 15/60    (2006.01)
G06T 15/70    (2006.01)

(52) U.S. Cl. .................. 345/426; 345/473

(58) Field of Classification Search ............. 345/426, 345/424, 473–475
See application file for complete search history.

(56) References Cited

U.S. PATENT DOCUMENTS

| | | | |
|---|---|---|---|
| 4,914,589 A | | 4/1990 | Crawford |
| 5,404,426 A | * | 4/1995 | Usami et al. .......... 345/420 |
| 5,673,213 A | * | 9/1997 | Weigl ................... 708/322 |
| 5,758,046 A | * | 5/1998 | Rouet et al. .......... 345/419 |
| 5,764,233 A | * | 6/1998 | Brinsmead et al. .... 345/419 |
| 5,777,619 A | * | 7/1998 | Brinsmead ............ 345/419 |
| 5,793,375 A | | 8/1998 | Tanaka |
| 5,870,096 A | * | 2/1999 | Anjyo et al. .......... 345/426 |
| 6,097,396 A | * | 8/2000 | Rouet et al. .......... 345/582 |
| 6,141,431 A | * | 10/2000 | Munetsugu et al. .... 382/100 |
| 6,348,924 B1 | * | 2/2002 | Brinsmead ............ 345/441 |
| 6,559,849 B1 | * | 5/2003 | Anderson et al. ...... 345/474 |
| 6,657,629 B2 | * | 12/2003 | Baraff et al. ......... 345/474 |

(Continued)

OTHER PUBLICATIONS

Zöckler et al., "Interactive Visualization Of 3D-Vector Fields Using Illuminated Stream Lines", 1996 IEEE, pp. 107-113 and 474.*

(Continued)

*Primary Examiner*—Kee M. Tung
*Assistant Examiner*—Roberta Prendergast
(74) *Attorney, Agent, or Firm*—Law Office of Jonathan Hollander

(57) ABSTRACT

A volumetric representation of a hair simulation model determines collective hair attributes. To determine inter-hair collisions, vertices include average velocities of the adjacent portions of the model. The average velocities determine target velocities. Forces for the model are determined from the target velocity values. To direct hair to a desired pose, vertices include target and current density values representing the density of adjacent portions of the model in the desired pose and current position, respectively. The differences in density values determine pressure forces applied to the model. To determine the illumination of the hair, vertices include density values representing the density of adjacent portions of the model. The density values define a hair surface, and signed distance values relative to the surface are determined for the vertices. Normal vectors are determined from the gradients of the signed distance values at locations corresponding the positions of the hairs.

21 Claims, 13 Drawing Sheets

U.S. PATENT DOCUMENTS

| | | | | |
|---|---|---|---|---|
| 6,720,962 | B1* | 4/2004 | Alter | 345/420 |
| 6,750,866 | B1* | 6/2004 | Anderson, III | 345/474 |
| 6,940,508 | B2* | 9/2005 | Lengyel | 345/420 |
| 6,952,218 | B1* | 10/2005 | Bruderlin | 345/581 |
| 2003/0179203 | A1 | 9/2003 | Bruderlin et al. | |

OTHER PUBLICATIONS

Glassner, A., "Situation normal [Gourand and Phong shading]", IEEE Computer Graphics and Applications, vol. 17, Issue 2, Mar.-Apr. 1997, pp. 83-87.*

Gibson, S., "Using distance maps for accurate surface representation in sampled volumes", IEEE Symposium on Volume Visualization, Oct. 19-20, 1998, pp. 23-30, 163.*

Xiaohu Guo et al., "Dynamic sculpting and deformation of point set surfaces", Proc. 11th Pacific Conference on Computer Graphics and Applications, Oct. 8-10, 2003, pp. 123-130.*

Tae-Yong Kim et al., "A thin shell volume for modeling human hair", Proc. Computer Animation 2000, pp. 104-111.*

Etzmuss, O.; Gross, J.; Strasser, W., "Deriving a particle system from continuum mechanics for the animation of deformable objects", IEEE Transactions on Visualization and Computer Graphics, vol. 9, Issue 4, Oct.-Dec. 2003, pp. 538-550.*

Tubic, D., "A volumetric approach for interactive 3D modeling", Proc. First International Symposium on 3D Data Processing Visualization and Transmission, Jun. 19-21, 2002, pp. 150-158.*

Sigg, C., "Signed distance transform using graphics hardware", IEEE Visualization, VIS 2003, Oct. 19-24, 2003, pp. 83-90.*

Neyret, F., "Modeling, animating, and rendering complex scenes using volumetric textures", IEEE Transactions on Visualization and Computer Graphics, vol. 4, Issue 1, Jan.-Mar. 1998, pp. 55-70.*

Ge Cong et al., "Shape metamorphism using p-Laplacian equation", Proceedings of the 17th International Conference on Pattern Recognition, vol. 4, Aug. 23-26, 2004, pp. 15-18.*

Ward, et al., "Adaptive grouping and subdivision for simulating hair dynamics", Proc 11th Pacific Conference on Computer Graphics and Applications, 2003. Oct. 8-10, 2003 pp. 234-243.*

Ward, et al., "Modeling Hair Using Level-of-Detail Representations", Proc 16th International Conference on Computer Animation and Social Agents, 2003, May 8-9, 2003, pp. 41-47.*

Wenjun Lao et al., "An improved algorithm for hairstyle dynamics", Proc. Fourth IEEE International Conference on Multimodal Interfaces, 2002, pp. 535-540.*

Kačić-Alesić, Z. et al., "A practical dynamics system", Proc. of 2003 ACM Siggraph/Eurographics Symposium on Computer Animation, pp. 7-16.*

Reeves, W. T., "Particle Systems-a Technique for Modeling a Class of Fuzzy Objects", ACM Transactions on Graphics 2, 1983, pp. 91-108.*

Kajiya, et al., "Rendering Fur with Three Dimensional Textures", 1989, ACM, pp. 271-280.*

Watanabe, Y., "A trigonal prism-based method for hair image generation", IEEE Computer Graphics and Applications, vol. 12, Issue 1, Jan. 1992, pp. 47-53.*

Anjyo, et al., "A Simple Method for Extracting the Natural Beauty of Hair", 1992, ACM, pp. 111-120.*

A. Witkin, et al., "Using Particles to Sample and Control Implicit Surfaces", Computer Graphics (ACM SIGGRAPH Proceedings), 1994. pp. 1-9.*

Iones, A. et al., "Fur and hair: practical modeling and rendering techniques", Proc. IEEE International Conference on Information Visualization, 2000, pp. 145-151.*

Zhan Xu et al., "V-HairStudio: an interactive tool for hair design", IEEE Computer Graphics and Applications, vol. 21, Issue 3, May/Jun. 2001, pp. 36-43.*

Kim, T. et al., "Interactive multiresolution hair modeling and editing", Proc. of 29th Annual Conference on Computer Graphics and interactive Techniques, SIGGRAPH '02, ACM Press, New York, NY, pp. 620-629.*

Bertails, et al., "Adaptive Wisp Tree—a multiresolutional control structure for simulating dynamic clustering in hair motion", Proc. of 2003 ACM Siggraph/Eurographics Symposium on Computer Animation, ACM, pp. 207-377.*

Volino, P. et al., "Animating complex hairstyles in real-time", Proc. of ACM Symposium on Virtual Reality Software and Technology, Nov. 2004, ACM Press, New York, NY, pp. 41-48.*

Wenqi Liang; Zhiyong Huang; "An enhanced framework for real-time hair animation", Proceedings. 11th Pacific Conference on Computer Graphics and Applications, Oct. 8-10, 2003, pp. 467-471.*

Ward, K.; et al., "A Survey on Hair Modeling: Styling, Simulation, and Rendering", Transactions on Visualization and Computer Graphics, vol. 13, Issue 2, Mar.-Apr. 2007, pp. 213-234.*

Chang, Johnny T. et al.; "A Pracitcal Model for Hair Mutual Interactions"; 2002, *Proceedings of the 2002 ACM Siggraph/Eurographics Symposium on Computer Animation*, pp. 73-80.

* cited by examiner

VOLUMETRIC HAIR RENDERING

CROSS-REFERENCES TO RELATED APPLICATIONS

This application claims priority to U.S. Provisional Application No. 60/556,532 entitled "HAIR RENDERING METHOD AND APPARATUS" filed on Mar. 25, 2004, U.S. Provisional Application No. 60/556,551 entitled "VOLUMETRIC METHODS FOR SIMULATION AND RENDERING OF HAIR" filed on Mar. 25, 2004, and U.S. Provisional Application No. 60/628,645 entitled "VOLUMETRIC HAIR SIMULATION AND RENDERING" filed on Nov. 16, 2004, and incorporates by reference the disclosures of these applications herein for all purposes. This application is related to U.S. patent application Ser. No. 11/072,049 entitled "VOLUMETRIC HAIR SIMULATION" filed on Mar. 3, 2005 and incorporates by reference the disclosure of that application herein for all purposes.

BACKGROUND OF THE INVENTION

The present invention relates to the field of computer animation. More particularly, the present invention relates to techniques and apparatus for animating and rendering of thin materials such as hair or fur. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Creating hair that moves and looks realistic is a challenge. Individual hairs typically have a large number of degrees of freedom. Additionally, many characters require thousands or millions of hairs. Manually animating each individual hair is typically too time-consuming to be practical. As a result, the motion of hair is often derived from a physics-based simulation. Hair simulations typically represent each hair as a set of masses and spring forces. Simulation forces, such as those representing gravity and wind, are applied to each hair to generate the desired hair motion.

Hair simulations often fail to accurately model the collective behavior and attributes of a set having a large number of hairs. For example, although hair simulations can generate realistic motions for individual hairs, they often fail to produce realistic collective motion for a set having a large number of hairs. One reason for this is that the dynamics of a large set of hairs is greatly affected by the millions of hair to hair collisions. Hair to hair collisions and friction make a set of hairs appear to move as a collective material, rather than millions of isolated elements. However, as each hair can collide with one or more other hairs in numerous locations, simulating hair collisions and friction forces for a set of thousands or millions of hairs is extremely difficult and computationally expensive.

Another collective attribute of a set of hairs is the pose, or intended position, orientation, and shape of the set of hair as a whole. Because hair can occlude or accentuate facial features, it is often a crucial aspect of the performance of a character. Animators often desire to specify a pose of a character model and its hair. Typically, animators do not care about the positions of individual hairs, provided the collective shape of the set of hair matches the desired pose. However, control over a hair simulation is limited to the specification of simulation forces. As a result, controlling the pose for a set of hair in a hair simulation is extremely difficult. Alternatively, the pose of a set of hair can be specified directly; however, this often overconstrains the hair simulation, resulting in implausible-looking hair motion.

The illumination and shading attributes of a set of hairs used for rendering is also a collective attribute. The appearance of each hair is determined in part from the geometric shape of each hair, as well as the shadowing and scattering of light from neighboring hairs. In particular, although a set of hairs includes thousands of separate hairs, it is often perceived having a hair "surface." It is difficult to determine this collective hair "surface" from thousands of separate hairs and to apply realistic-looking illumination and shading.

It is therefore desirable for a system and method to efficiently determine the realistic-looking collective attributes of large sets of simulated hairs, including: hair to hair collisions and friction; desired hair poses; and hair surface illumination attributes.

BRIEF SUMMARY OF THE INVENTION

An embodiment of the invention uses a volumetric representation to efficiently model the collective attributes of large sets of simulated hair. The volumetric representation determines hair responses to hair to hair collisions and illumination. The volumetric representation is also used to direct the set of hair to poses. A volumetric representation of a hair simulation model is created from a collection of polyline hair models. In an embodiment, the volumetric representation is a voxel grid that includes attribute values at each vertex derived from adjacent portions of the hair simulation model.

In an embodiment, to determine hair to hair collisions and friction, vertices include an average velocity value of the adjacent portions of the hair simulation model. A target velocity value for each vertex is determined from its average velocity value. A drag force for each portion of the hair simulation model is determined from the target velocity values of its adjacent vertices. To direct the set of hair to a desired pose, vertices of the volumetric representation include target density values representing the density of adjacent portions of the hair simulation model in the desired pose and current density values representing the density of adjacent portions of the hair simulation model in its current position. The differences in target and current density values at each vertex are used to determine a set of pressure forces to be applied to the hair simulation model. To determine the illumination of a set of hair, vertices of the volumetric representation include density values representing the density of adjacent portions of the hair simulation model. A hair surface is defined using the density values, and signed distance function values relative to the surface are determined for the vertices. Normal vectors are determined from the gradient of the signed distance function values at locations corresponding the positions of the set of hairs. In a further embodiment, normal vectors can be reorientated according to the deformations of the set of hairs from a default position to their current positions.

BRIEF DESCRIPTION OF THE DRAWINGS

The invention will be described with reference to the drawings, in which.

In the drawings, the use of identical numbers indicates identical elements.

DETAILED DESCRIPTION OF THE INVENTION

Figure 1:
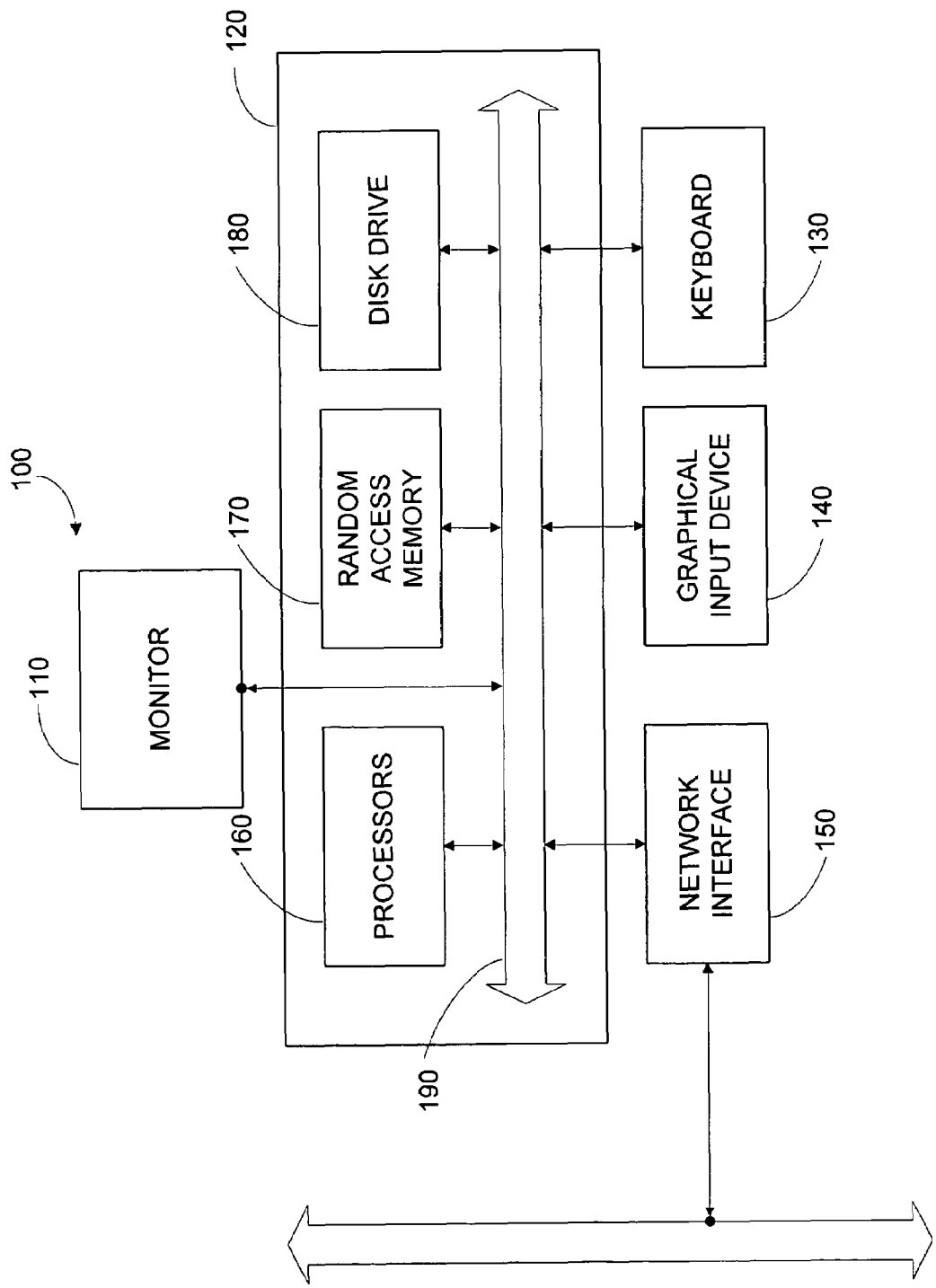
FIG. 1 illustrates an example computer system suitable for implementing an embodiment of the invention.

FIG. 1 illustrates an example computer system suitable for implementing an embodiment of the invention. FIG. 1 illustrates an example computer system 100 capable of implementing an embodiment of the invention. Computer system 100 typically includes a monitor 110, computer 120, a keyboard 130, a user input device 140, and a network interface 150. User input device 140 includes a computer mouse, a trackball, a track pad, graphics tablet, touch screen, and/or other wired or wireless input devices that allow a user to create or select graphics, objects, icons, and/or text appearing on the monitor 110. Embodiments of network interface 150 typically provides wired or wireless communication with an electronic communications network, such as a local area network, a wide area network, for example the Internet, and/or virtual networks, for example a virtual private network (VPN).

Computer 120 typically includes components such as one or more general purpose processors 160, and memory storage devices, such as a random access memory (RAM) 170, disk drives 180, and system bus 190 interconnecting the above components. RAM 170 and disk drive 180 are examples of tangible media for storage of data, audio/video files, computer programs, applet interpreters or compilers, virtual machines, embodiments of the herein described invention including geometric scene data, object data files, shader descriptors, a rendering engine, output image files, texture maps, and displacement maps. Further embodiments of computer 120 can include specialized audio and video subsystems for processing and outputting audio and graphics data. Other types of tangible media include floppy disks; removable hard disks; optical storage media such as DVD-ROM, CD-ROM; non-volatile memory devices such as flash memories; read-only memories (ROMS); battery-backed volatile memories; and networked storage devices.

Figure 2:
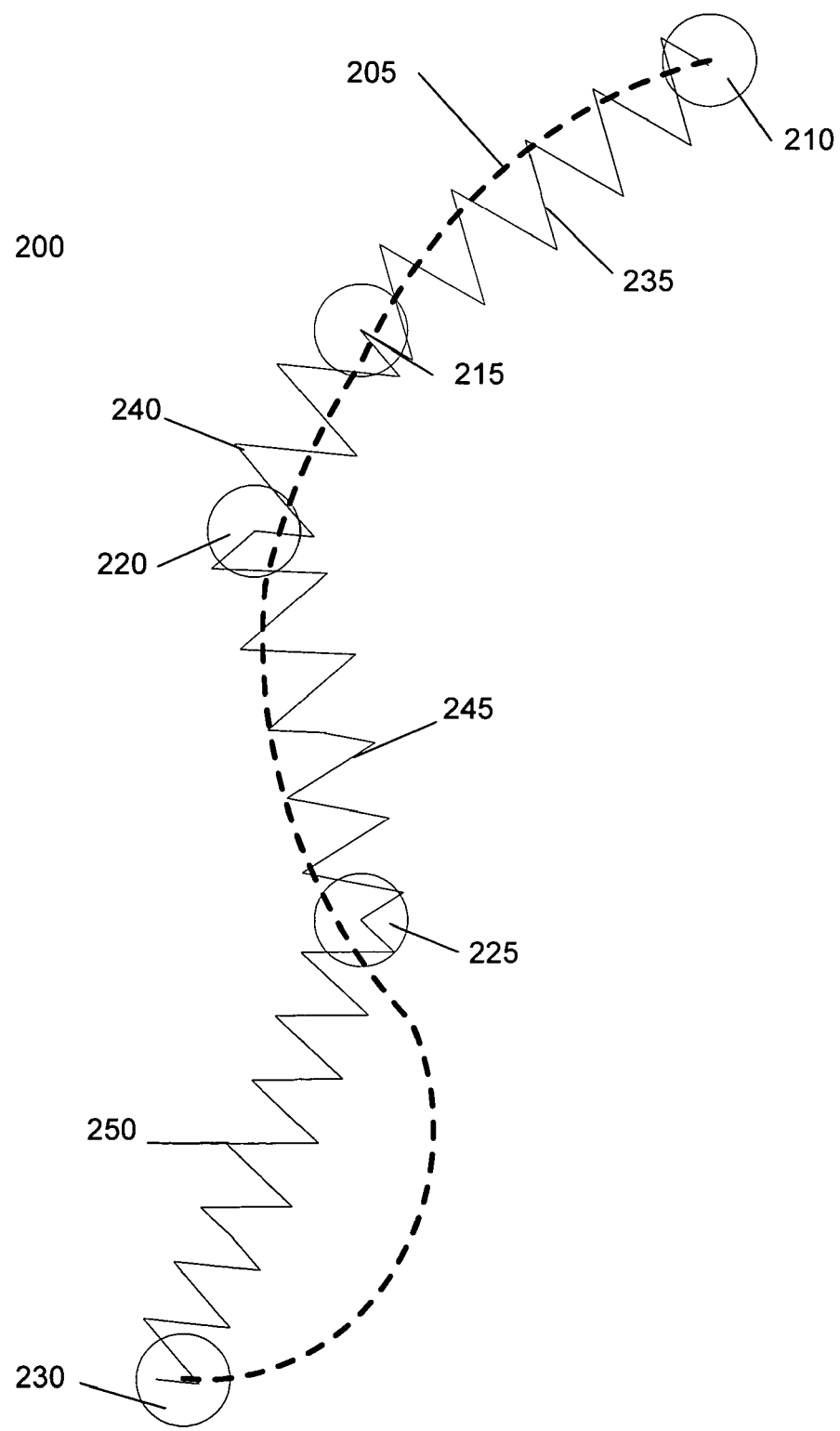
FIG. 2 illustrates an example hair simulation suitable for implementing an embodiment of the invention.

FIG. 2 illustrates an example hair simulation model 200 suitable for implementing an embodiment of the invention. In this example hair simulation model 200, a hair strand 205 is defined. In an embodiment, a strand of hair is defined as a curve in three-dimensional space. B-splines or other representations of curves can be used to define each hair. A hair simulation model 200 corresponding to the hair strand 205 is used to simulate the hair dynamics. In an embodiment, the hair simulation model 200 is represented as spring-mass system including hair particles 210, 215, 220, 225, and 230 and spring forces 235, 240, 245, 250. Each hair particle is associated with at least one spring force between itself and an adjacent hair particle. In an embodiment, each spring force applies an attraction or repulsion force to its associated hair particles that is proportional to its length. Additionally, each hair particle has a mass. In an embodiment, the mass of a hair particle is proportional to the distance between the hair particle and one or more adjacent hair particles. In an alternate embodiment, each hair particle has a fixed mass and each spring has a fixed length.

The hair simulation models the dynamics of the hair simulation model under the influence of its spring forces and any simulation forces, such as gravity, wind, or other forces discussed in detail below. In an embodiment, a subset of the set of hairs, referred to as key hairs, are simulated to determine their motion. The motion of the remaining portion of the set of hairs can be interpolated from the motion of neighboring keyhairs. Although aspects of the invention will be described with reference to this hair simulation, alternate embodiments of the invention can use any type of simulation model to simulate the motion of hair strands in response to forces, such as models for rigid body dynamics or alternative particle dynamics systems.

Figure 3:
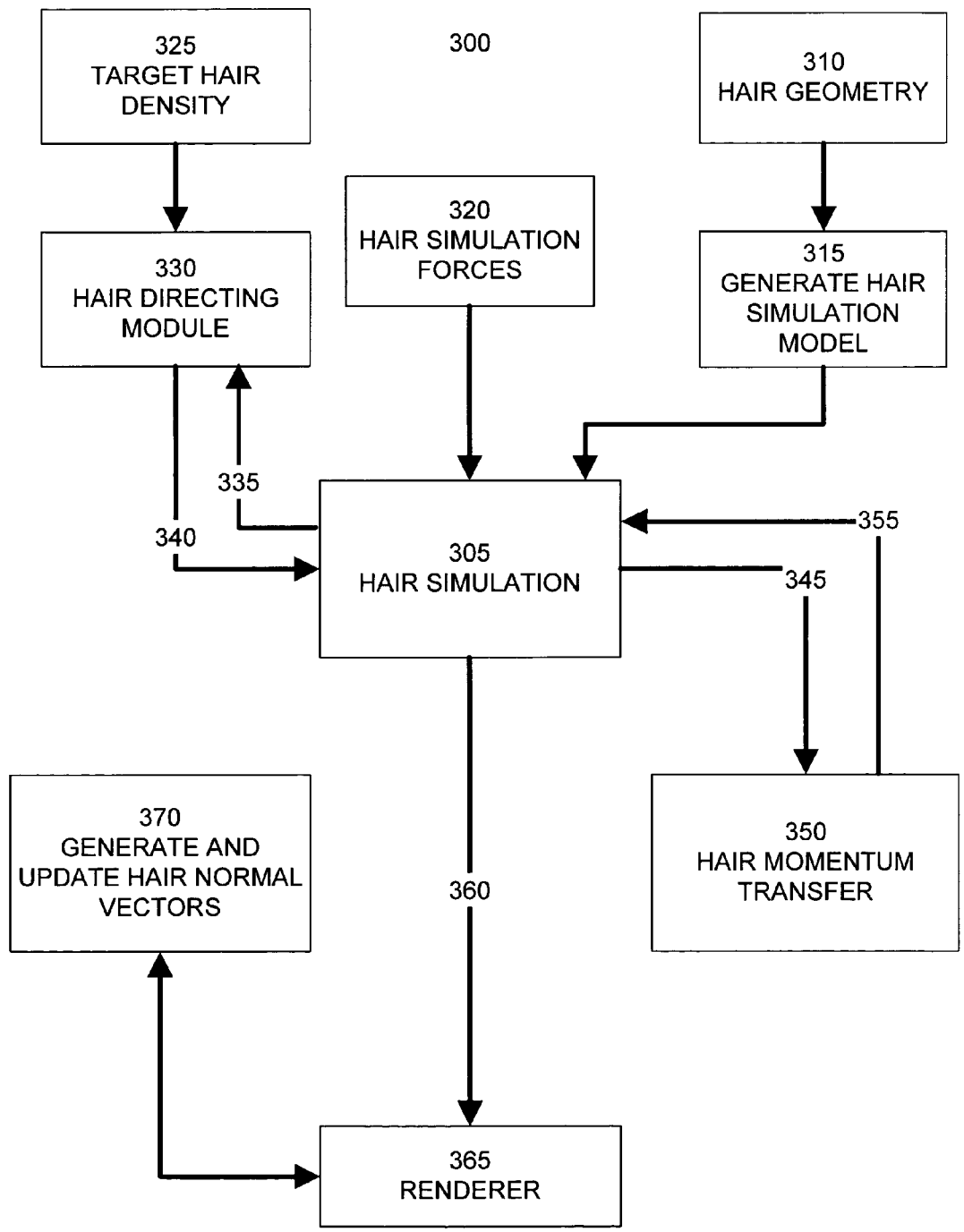
FIG. 3 illustrates a block diagram of a hair simulation and rendering system according to an embodiment of the invention.

FIG. 3 illustrates a block diagram of a hair simulation and rendering system 300 according to an embodiment of the invention. System 300 includes a hair simulation model 305 for simulating the motion of hair. A representation of hair geometry 310 is converted to a hair simulation model 315. In an embodiment, the hair geometry 310 is a set of curves defining hair strands and the hair simulation model 315 is a spring-mass particle system, as discussed above with reference to FIG. 2. The hair simulation model can represent thousands or millions of separate hairs. In an alternate embodiment, the hair simulation model 315 and the hair geometry 310 are the same. The hair simulation model is input to the hair simulation module 305.

Hair simulation forces 320 are also input to the hair simulation module 305. Hair simulation forces 320 are forces to be applied to some or all of the hair strands in the hair simulation model. Hair simulation forces 320 can include forces representing specific phenomena, such as gravity, wind, and centrifugal force. Hair simulation forces 320 can also include fictitious forces added by animators for a resulting desired aesthetic effect. Hair simulation forces 320 can be constant or vary in direction and magnitude over time.

The hair simulation module 305 is adapted to simulate the motion of the hair simulation model 315 under the influence of hair simulation forces 320 and any additional forces over a specified range of simulation time. The hair simulation module 305 can use any technique known in the art to simulate the motion of objects under the influence of forces.

As discussed in detail below, an embodiment of the invention enables animators to specify one or more desired hair poses. The desired hair pose is converted to a target hair density 325, specifying the desired density of hair particles in space corresponding with the desired hair pose. In an embodiment, the hair simulation module 305 outputs at least a portion of the state of the hair simulation model 335, such as the position of hair particles, at a given simulation time. Using the target hair density 325 and the state of the hair simulation model 335 at the given simulation time, the hair directing module 330 determines a set of pressure forces 340 to be applied to the hair simulation model. The set of pressure forces 340 are returned to the hair simulation module 305 where they are used to gradually and realistically push the hair simulation model into the desired pose.

An embodiment of the invention accounts for hair to hair collisions and friction using a momentum transfer module 350. The hair simulation module 305 outputs at least a portion of the state of the hair simulation model 345, such as the position, masses, and velocities of hair particles, at a given simulation time to the momentum transfer module 350. As discussed in detail below, the momentum transfer module 350 determines a set of drag forces 355 corresponding to the effect of hair to hair collisions and friction on the simulation model. The set of drag forces 355 are returned to the hair simulation module 305 where they are used to make the hair simulation model appear to move as a collective material.

Hair simulation module 305 creates a set of hair animations 360 specifying the motion of the hair geometry 310 under the influence of the hair simulation forces 320 and any additional forces, such as pressure forces 340 and drag forces 355, during the simulation time. In an embodiment, the hair animations 360 specify the motions of hair particles in a hair simulation model during the simulation time. The motions of hair particles are then converted to corresponding motions of the hair geometry 360. In a further embodiment, the motion of additional hairs are determined by interpolating from the motion of the hair geometry.

Renderer 365 converts a description of a scene, including geometry, motion, lighting, texturing, and other attributes, into one or more two dimensional images. Rendered 365 can use any technique known in the art for such purposes, including ray tracing and scanline rendering. In an embodiment, renderer 365 uses the hair geometry 310 and the set of hair animations 360 to create one or more images. Additional elements, including character models and other objects, can also be processed by the renderer 365 and included in the resulting images. To determine at least a portion of the optical properties of the hair, it is often necessary to have a set of normal vectors for the "surface" defined by hair geometry. For example, the Phong illumination model approximates the scattering of light off of a surface using a function dependent upon a normal vector for the surface. As discussed in detail below, module 370 generates normal vectors to be used by the renderer 365 to illuminate the hair geometry. As the hair geometry is moved according to the set of hair animations 360, module 370 updates the normal vectors.

Figure 4:
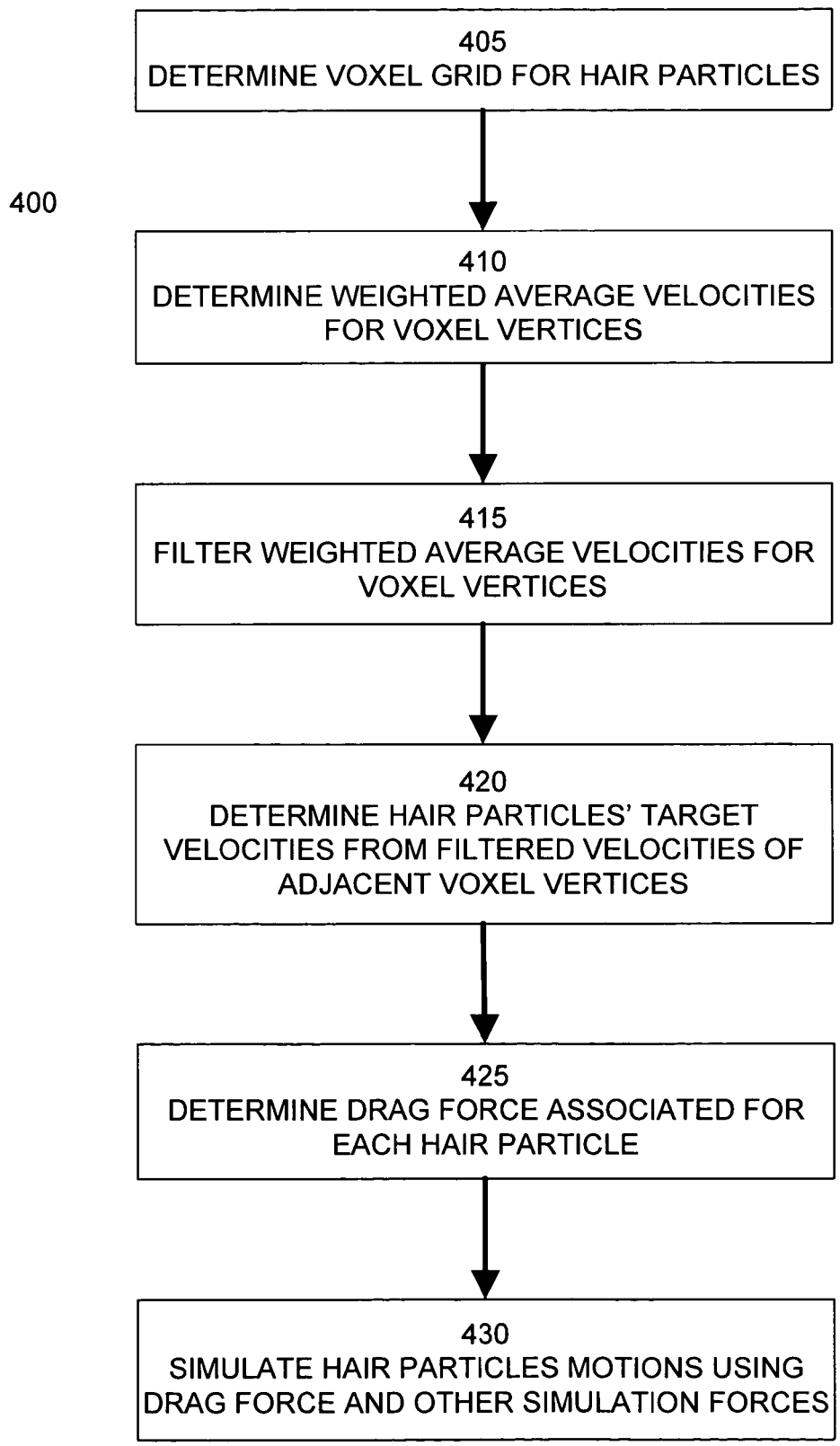
FIG. 4 illustrates a method for accounting for hair collisions according to an embodiment of the invention.

FIG. 4 illustrates a method 400 for accounting for hair collisions according to an embodiment of the invention. In an embodiment, portions of method 400 can be performed by momentum transfer module 350, discussed above. At step 405, at least a portion of the hair simulation model is placed in a three-dimensional grid. Each grid element, referred to as a voxel, represents a portion of the space occupied by the simulation model. In an embodiment, the hair particles and their respective masses, positions, and velocities are placed in the voxel grid.

Step 410 determines a weighted average velocity for each vertex of the voxel grid based upon the positions, velocities, and masses of the hair particles in adjacent grid cells. In an embodiment, for each voxel vertex, located at a position (x,y,z), a density value is determined as follows:

$$D_{xyz} = \sum_i (1 - |P_x^i - x|)(1 - |P_y^i - y|)(1 - |P_z^i - z|)$$

where $(P_x^i, P_y^i, P_z^i)$ are the $i^{th}$'s particle coordinates in world space.

Using the density value, $D_{xyz}$, a corresponding weighted average velocity, $V_{xyz}$, for each voxel vertex located at a position (x,y,z) is determined in an embodiment as follows:

$$V_{xyz} = \frac{\sum_i (1 - |P_x^i - x|)(1 - |P_y^i - y|)(1 - |P_z^i - z|)v^i}{D_{xyz}}$$

where $(P_x^i, P_y^i, P_z^i)$ are the $i^{th}$ particle coordinates in world space, $v^i$ is the $i^{th}$ particle's velocity, $D_{xyz}$ is the density value of the voxel vertex. In this embodiment, the weighted average velocity is the mass- and position-weighted average of the velocities of the hair particles neighboring a voxel vertex.

Figure 5A:
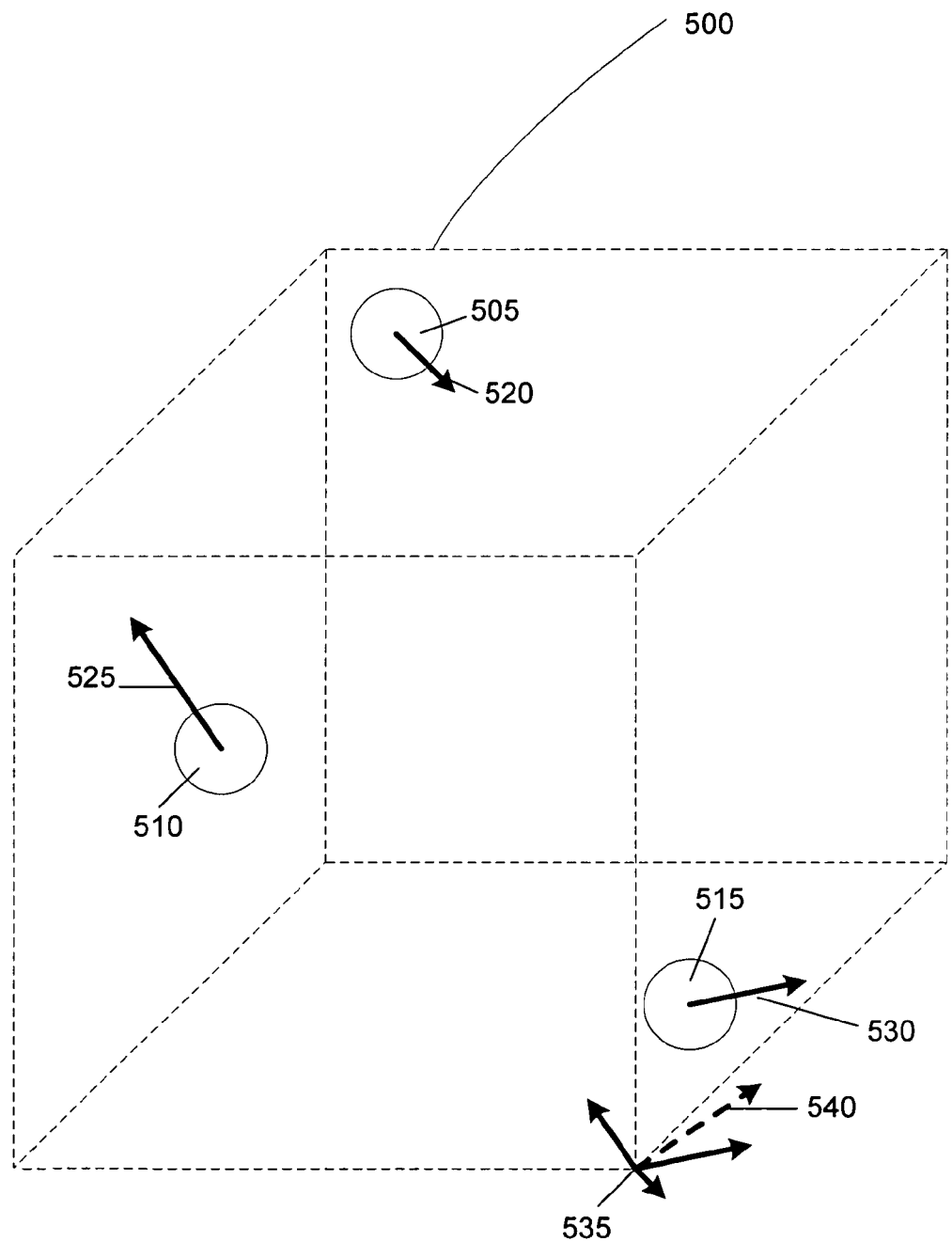
FIGS. 5A-5B illustrate an example application of a method for accounting for hair collisions according to an embodiment of the invention.
Figure 5B:
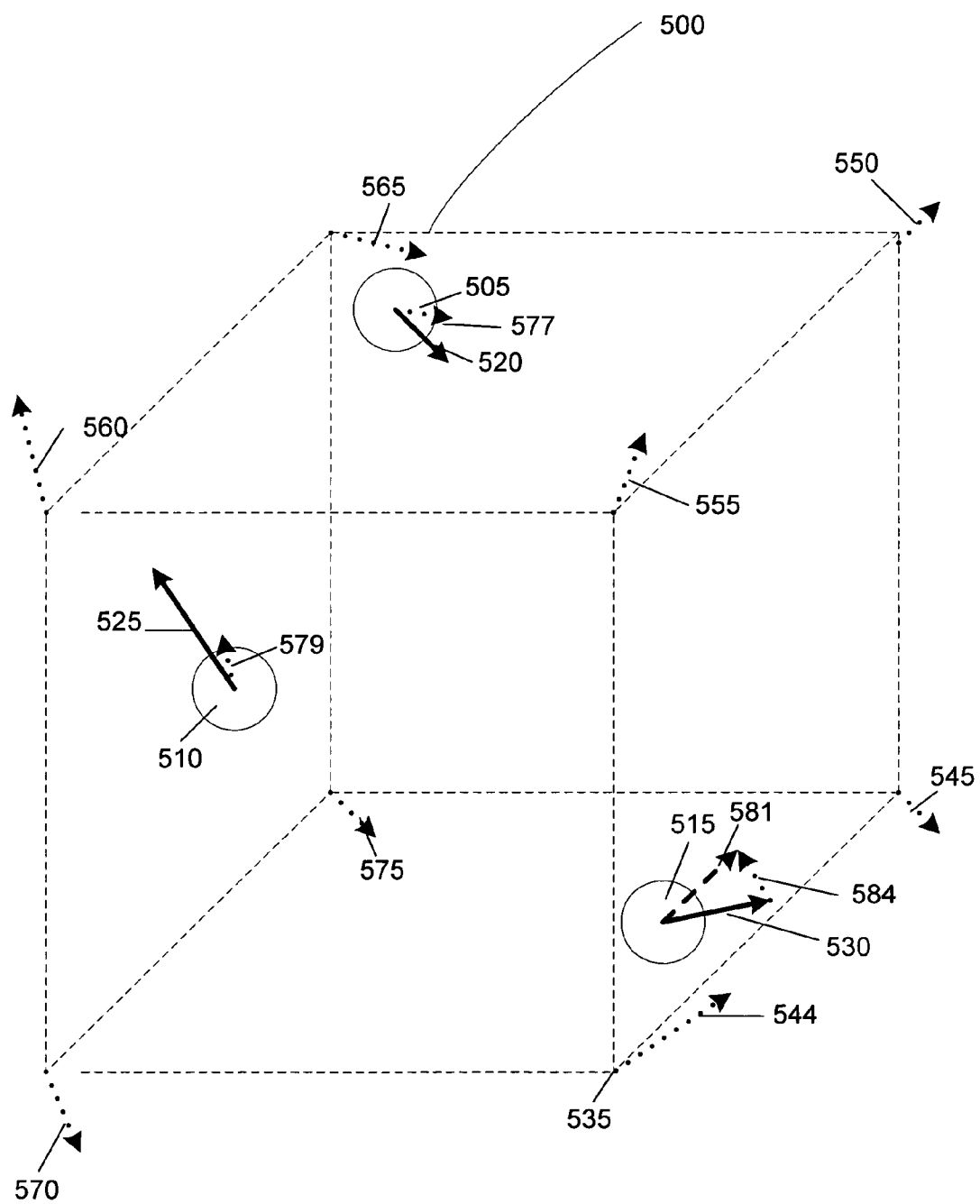

FIGS. 5A-5B illustrate an example application of a method for accounting for hair collisions according to an embodiment of the invention. FIG. 5A illustrates an example determination of an average weighted velocity according to an embodiment of the invention. Example voxel 500 includes hair particles 505, 510, and 515. Hair particles 505, 510, and 515 have velocities 520, 525, and 530, respectively. Using the above equations, an average weighted velocity 540 of vertex 535 can be determined from the combination of the velocities 520, 525, and 530 weighted by the corresponding masses and positions of particles 505, 510, and 515. It should be noted that the average weighted velocity value 540 can also include the contribution from the velocity of hair particles in adjacent voxels sharing vertex 535. These adjacent voxels have been omitted from FIG. 5A for clarity.

Continuing with method 400, step 415 filters the average weighted velocity values of the voxel vertices. Step 415 ensures that energy conservation is maintained by the method. In an embodiment, a filter kernel is applied to the voxel grid. Examples of filter kernels include low-pass and Gaussian filters. The result of the filtering is a filtered average velocity value for each voxel vertex.

Step 420 determines a target velocity for each hair particle. In an embodiment, the target velocity of a hair particle is a combination of the filtered average velocity values of the adjacent voxel vertices weighted according to the mass and position of the hair particle. In an embodiment, these weightings are the inverse of the weightings used to determine a hair particle's contributions to the average weighted velocity values of adjacent voxel vertices.

FIG. 5B illustrates an example determination of a target velocities for hair particles according to an embodiment of the invention. Continuing with the example of FIG. 5A, the example voxel 500 in FIG. 5B has filtered average weighted velocity values 544, 545, 550, 555, 560, 565, 570, and 575 associated with its vertices. Using these filtered average weighted velocity values, target velocities for hair particles 505, 510, and 515 can be determined. In an embodiment, the target velocities 577, 579, and 581 of hair particles 505, 510, and 515, respectively, are determined from weighted sums of the filtered average weighted velocity values 544, 545, 550, 555, 560, 565, 570, and 575. For a given hair particle, the weight of each voxel vertex is inversely proportional to the distance of the hair particle to the voxel vertex. As a result, voxel vertices close to a hair particle will have a higher weight than more distant vertices.

Continuing with method 400, step 425 determines a drag force for each hair particle. The drag force is a force pushing the hair particle towards its target velocity. In an embodiment, the drag term applied to the hair particles is similar to a second order Laplacian diffusion that occurs in Newtonian fluids, and provides for the dissipation of energy. In an embodiment, the drag force has an orientation along the direction of the vector difference between a hair particle's target velocity and current velocity. For example, a drag force for hair particle 515 in FIG. 5B would be in the direction of vector 584. In an embodiment, the drag force can be expressed as follows:

$$\overrightarrow{F_{Drag}^i} = \alpha \left( \overrightarrow{V_{Target}^i} - \overrightarrow{V_{Current}^i} \right)$$

where α is a scalar value typically between 0 and 1. The value of a can be varied to change the characteristics of hair motion. Higher values of α tend to result in hairs that move together more coherently, while smaller values of α tend to result in hairs that move more independently of its neighbors. In a further embodiment, the magnitude of the drag force can be set to constrain neighboring hairs to move at similar velocities, thereby preventing the appearance of interpenetrating hair locks and fly-away or "stray" hairs.

Step 430 simulates the motions of the hair particles under the influence of the drag forces and optionally any additional simulation forces, as discussed above. The effect of these additional drag forces in the hair simulation tend to force neighboring hair particles towards similar target velocities. Furthermore, the derivation of drag forces from the average velocities of neighboring hair particles approximates the effect of energy dissipation resulting from hair to hair collisions and friction. For example, if a velocity of a hair particle is initially much faster than its neighbors, the hair particle's drag force will tend to slow it down. Similarly, the drag force for a hair particle much slower than its neighbors will tend to speed up the hair particle. This approximates the momentum transfer resulting from hair to hair collisions and friction without the burden of calculating thousands or millions of collisions between hairs. Method 400 can be repeated during the simulation of hair particles over the duration of simulation time, so that as hair particles move and come into close proximity of different hair particles, their drag forces can be updated accordingly.

Figure 6:
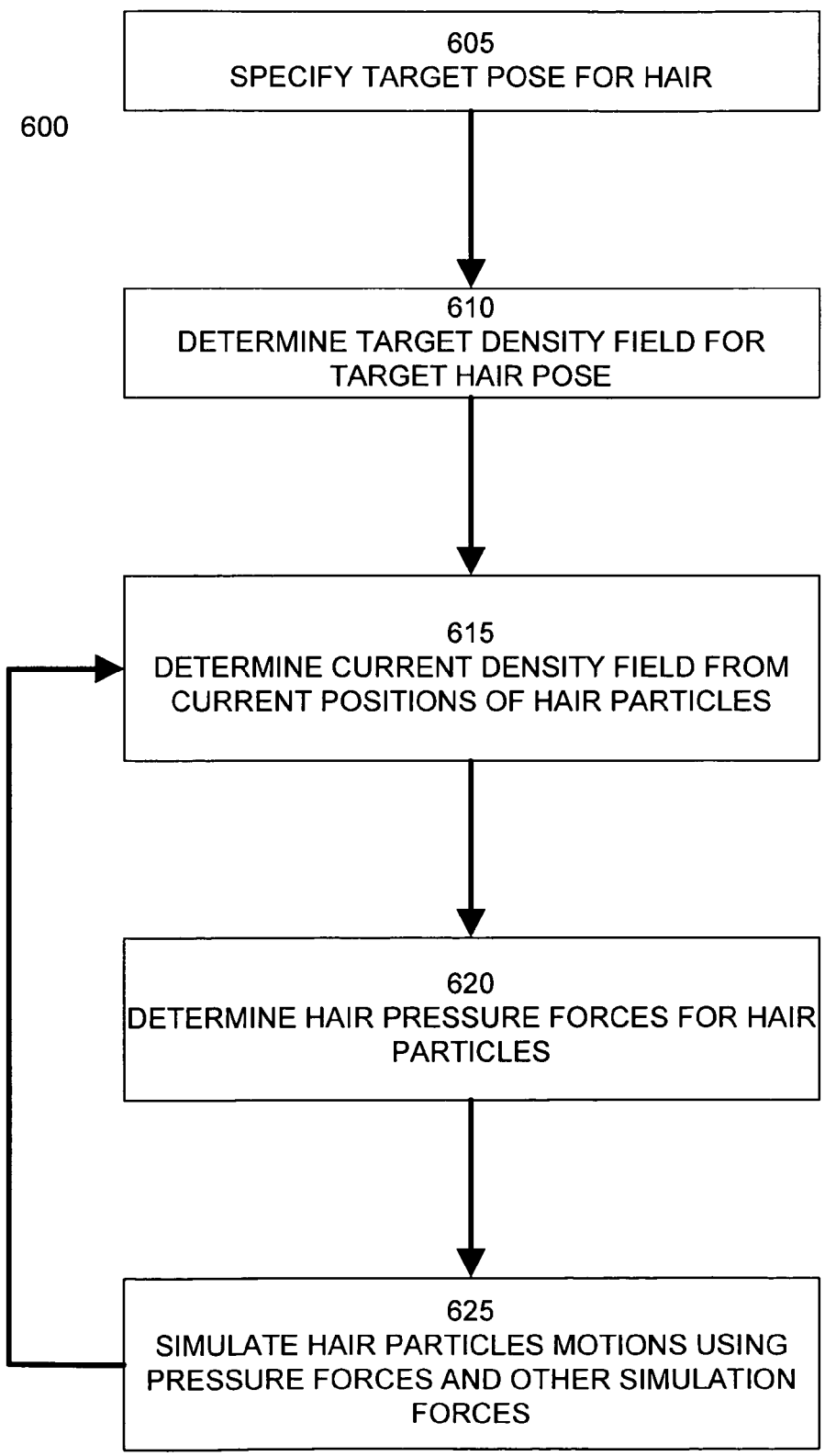
FIG. 6 illustrates a method for directing a hair simulation towards a desired hair pose according to an embodiment of the invention.

As discussed above, animators often desire to specify a pose of a character model and its hair. Typically, animators specify two or more poses in frames at different times, and the animation system then determines the appropriate positions of the character model and its hair in all of the intervening frames. FIG. 6 illustrates a method 600 for directing a hair simulation towards a desired hair pose according to an embodiment of the invention.

In step 605, a target hair pose is specified. In an embodiment, a target hair pose can be specified by directly manipulating the hair geometry into the overall desired shape. Additionally, a target hair pose can be taken from a previously performed hair simulation. For example, hair motion can be simulated under the influence of one or more simulation forces. The resulting hair motion can then be examined by the animators and one or more frames can be selected as target poses for further simulations. Poses from different simulations can also be combined to create a target hair pose.

Using the target hair pose, step 610 determines a target hair density field. In an embodiment, the target hair density field is represented in a voxel grid, as described above. Hair particles adjacent to voxel vertices are used to create density values. In an embodiment, for each voxel vertex, located at a position (x,y,z), a density value is determined as follows:

$$D_{xyz} = \sum_i (1 - |P_x^i - x|)(1 - |P_y^i - y|)(1 - |P_z^i - z|)$$

where $(P_x^i, P_y^i, P_z^i)$ are the $i^{th}$'s particle coordinates in world space.

Figure 7A:
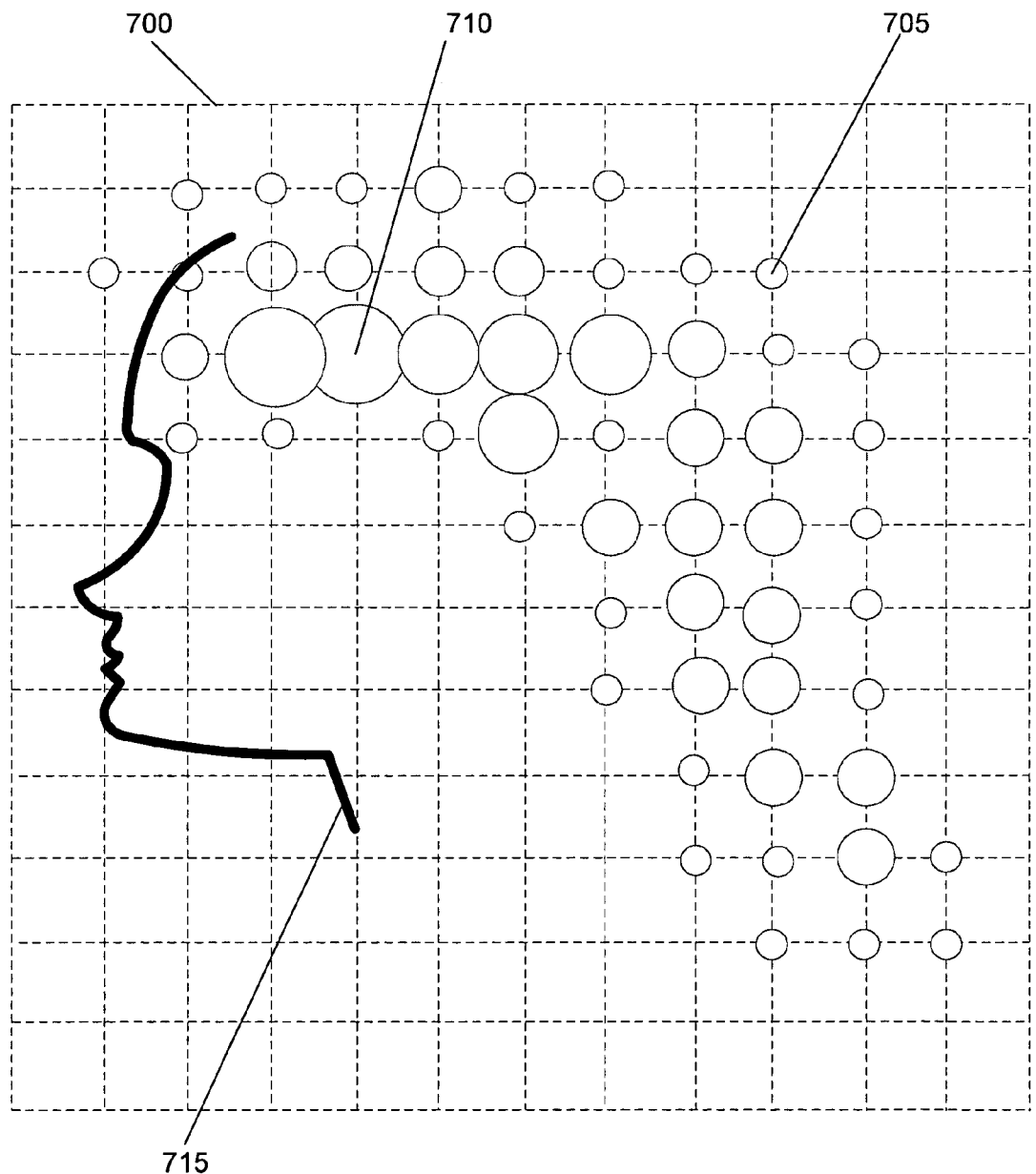
FIGS. 7A-7B illustrate an example application of a method for directing a hair simulation towards a desired hair pose according to an embodiment of the invention.
Figure 7B:
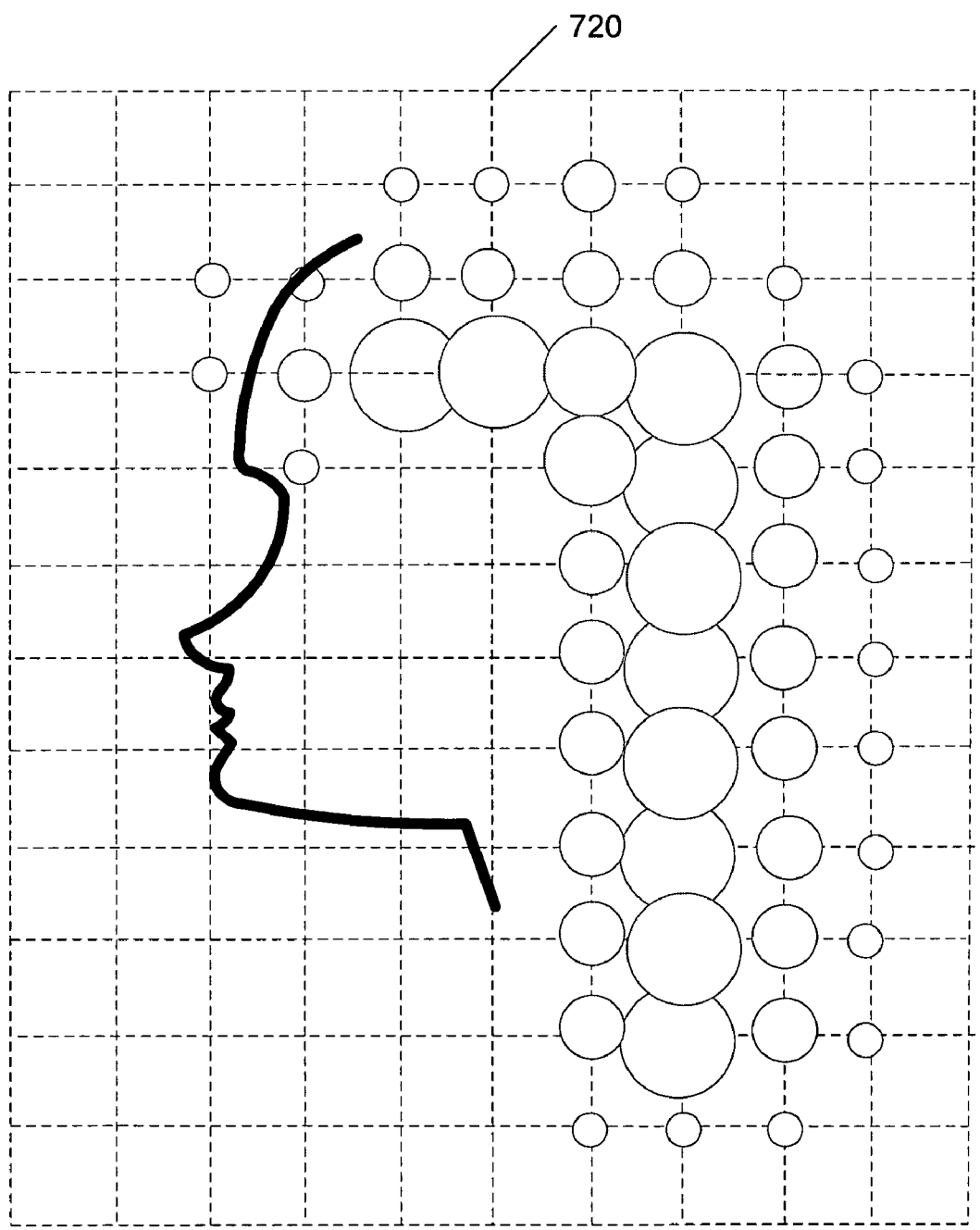

FIGS. 7A 7B illustrate an example application of a method for directing a hair simulation towards a desired hair pose according to an embodiment of the invention. FIG. 7A illustrates an example target hair density field 700 in a voxel grid according to an embodiment of the invention. The example target hair density field 700 represents an example desired hair pose, such as hair blown backwards as if under the influence of wind. In FIGS. 7 A-B, the size of each circle represents the relative density value of each voxel vertex. For example, the voxel vertex 705 has a relatively low density value, indicating that there are relatively few hair particles in the adjacent voxel cells. Similarly, voxel vertex 710 has a relatively high density value, indicating that there are a relatively large number of hair particles in the adjacent voxel cells. A portion of a character model 715 is shown in FIGS. 7A and 7B for clarity; however, an embodiment of method 600 does not use this character model 715 to direct hair motion to a target hair pose.

Returning to method 600, step 615 determines a current hair density field from the current positions of the hair particles. In an embodiment, the current hair density field is determined in a similar manner as the target hair density field in step 610. FIG.7B illustrates an example current hair density field 720 according to an embodiment of the invention. The example target hair density field 720 represents an example of the current positions of the hair, such as the hair at rest.

Step 620 determines a set of hair pressure forces for the voxel vertices. In an embodiment, the set of hair pressure forces are used to nudge hair particles towards the desired target pose. In an embodiment, the set of hair pressure forces are gradient forces derived from the current hair density field $D_s$ and the target hair density field $D_t$. The energy in the grid is specified by the following equation:

$$E = \frac{1}{2} \sum_{x,y,z} (D_s - D_t)$$

The force on a particle $P^i$ is then:

$$F = \left( \frac{\partial E}{\partial P_x}, \frac{\partial E}{\partial P_y}, \frac{\partial E}{\partial P_z} \right) = \sum_{x,y,z} (D_s - D_t) \cdot \left( \frac{\partial D}{\partial P_x}, \frac{\partial D}{\partial P_y}, \frac{\partial D}{\partial P_z} \right)$$

Letting:

$D_d = D_s - D_t$ $ax = (1 - |P_x - x|)$ $ay = (1 - |P_y - y|)$ $az = (1 - |P_z - z|)$

Taking the derivative of D from the voxel hair density $D_{xyz}$ with respect to particle $P_x^i$, the pressure force on particle $P_x^i$ is as follows:

$$F_x^i = (ay)(az)(D_d(x,y,z) - D_d(x+1,y,z)) + (1-ay)(az)(D_d(x,y+1,z) - D_d(x+1,y+1,z)) + (ay)(1-az)(D_d(x,y,z+1) - D_d(x+1,y,z+1)) + (1-ay)(1-az)(D_d(x,y+1,z+1) - D_d(x+1,y+1,z+1))$$

Similar computations are performed to determine the pressure force in the y direction $F_y^i$ and the z direction $F_z^i$. To reduce discontinuities in the derivative, when $P_x, P_y, P_z$ are equal to x, y, or z, respectively, an embodiment sets the derivative to 0.

Step 620 determines a hair pressure force for each hair particle. It should be noted that each hair particle's pressure force is determined from a weighted combination of the differences between the current and target hair densities for the voxel vertices adjacent to the hair particle. For example, the weights, such as ax, ay, and az, are based upon the distances between the hair particle and the adjacent voxel vertices.

Step 625 simulates the motions of the hair particles under the influence of the set of pressure forces and optionally any additional simulation forces, as discussed above. The effect of these additional pressure forces in the hair simulation tend to nudge the set of hair particles towards an arrangement having a density specified by the target hair pose. For example, if the density of a voxel grid cell has a hair particle density higher than that specified by the target hair density field, the hair pressure forces for particles in this voxel grid cell will push hair particles towards adjacent hair cells. Because the hair pressure forces are based upon desired hair densities associated with the target hair pose, rather than desired positions for specific hairs, the motion of hairs towards the target pose is determined by the hair simulation and appears natural. Steps 615 and 620 can be repeated during the simulation of hair particles over the duration of simulation time, so that as hair particles move and the current hair density field changes, their pressure forces can be updated accordingly.

Figure 8:
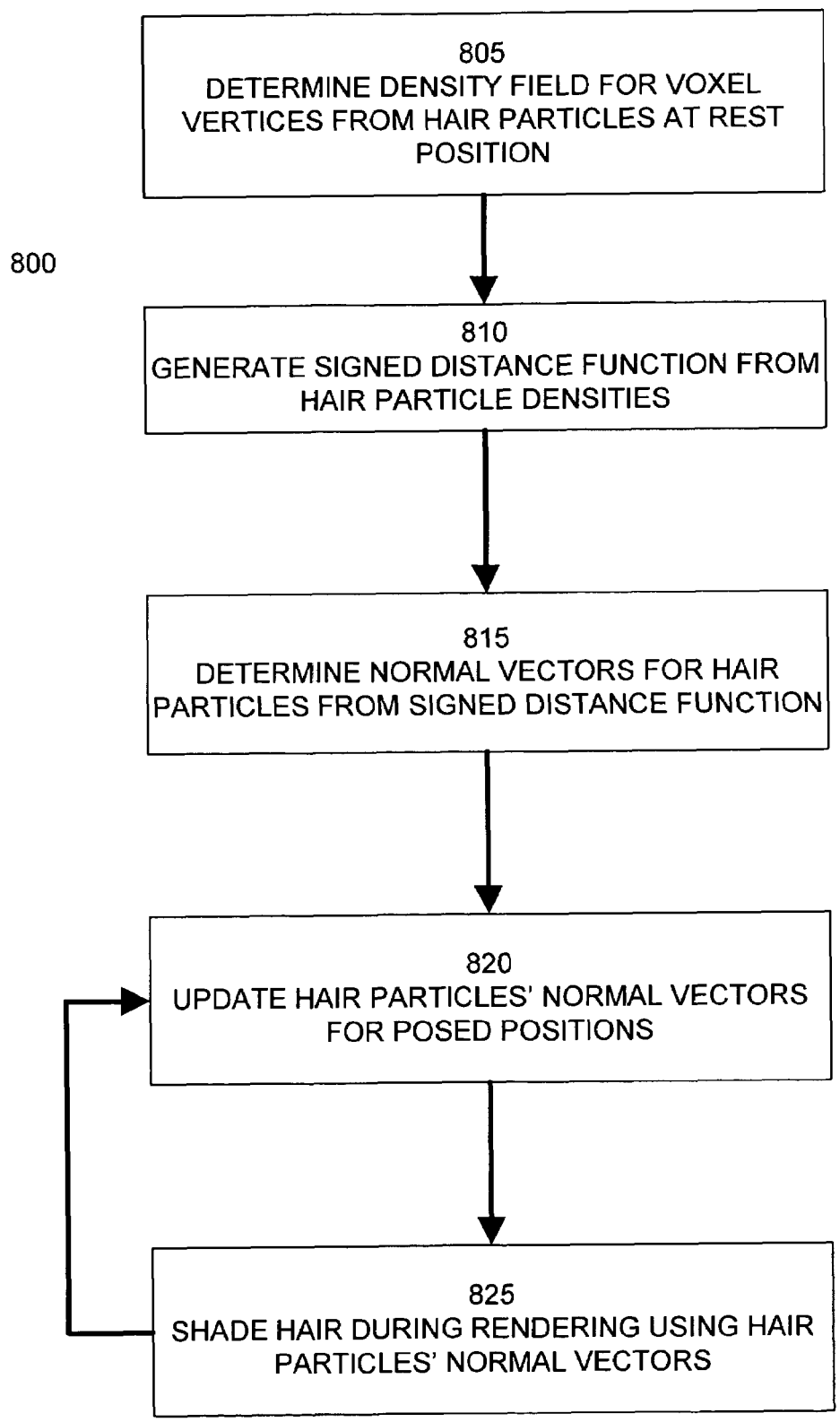
FIG. 8 illustrates a method for determining normal vectors for shading simulated hairs according to an embodiment of the invention.

To determine at least a portion of the optical properties of the hair, it is often necessary to have a set of normal vectors for the "surface" defined by hair geometry. For example, the Phong illumination model approximates the scattering of light off of a surface using a function dependent upon a normal vector for the surface. FIG. 8 illustrates a method 800 for determining normal vectors for shading simulated hairs according to an embodiment of the invention.

Figure 9A:
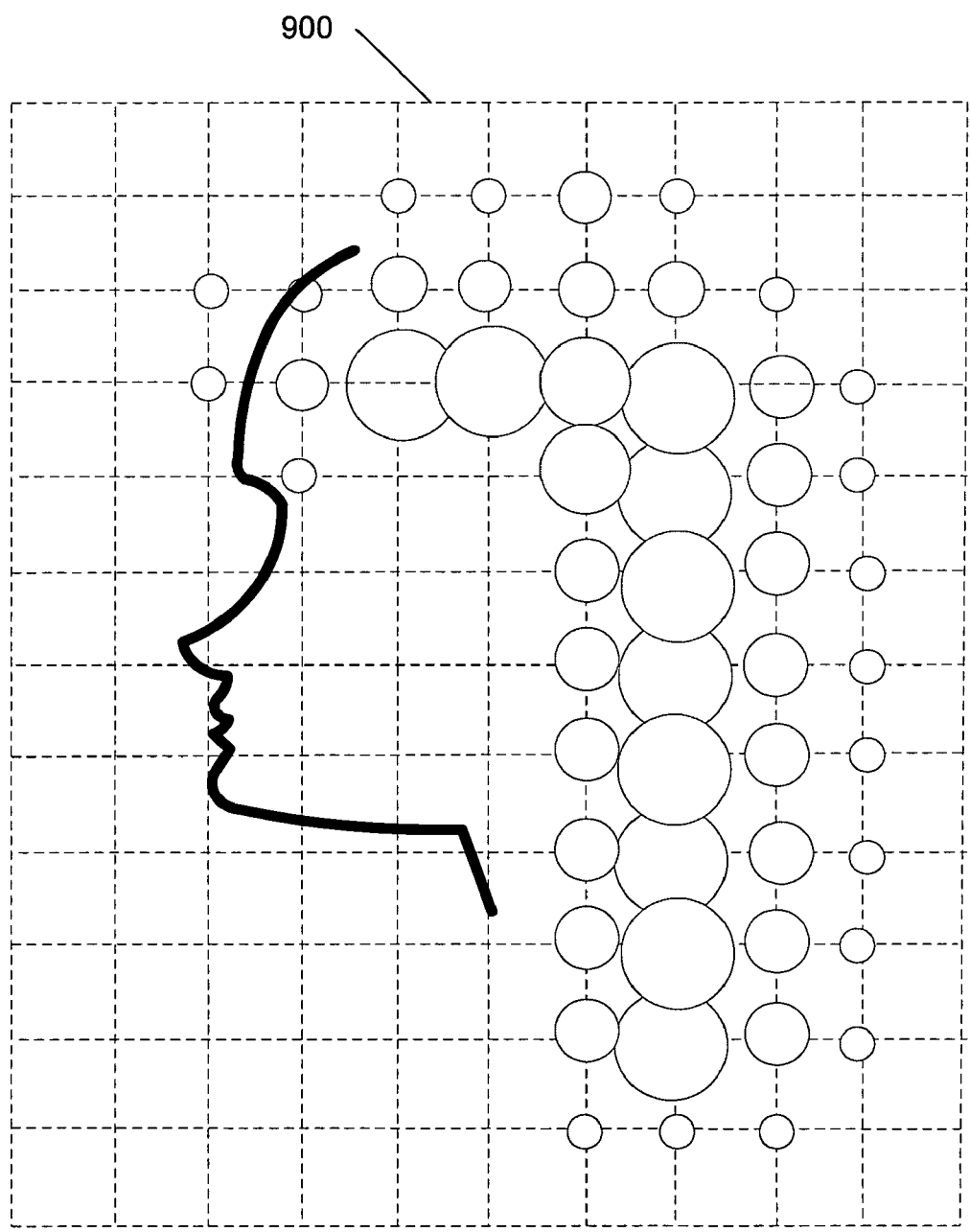
FIGS. 9A-9B illustrate an example application of a method for determining normal vectors for shading simulated hairs according to an embodiment of the invention.
Figure 9B:
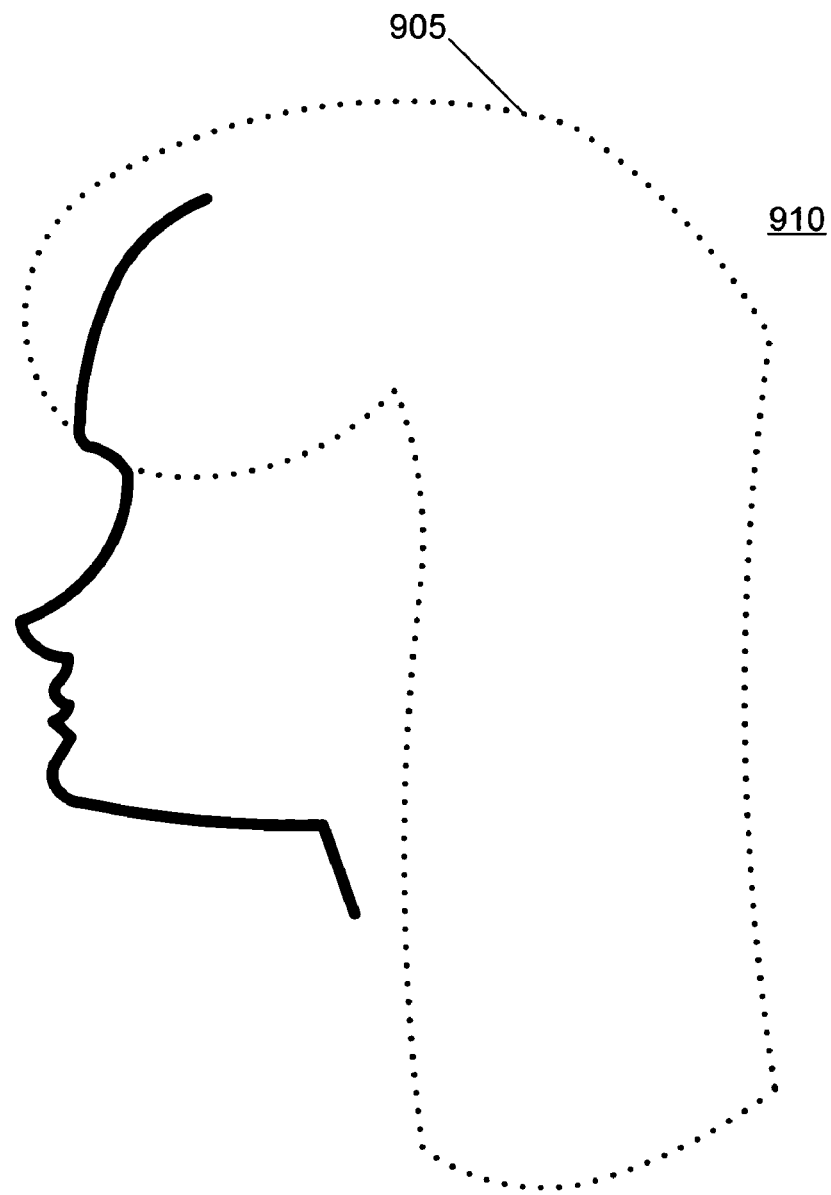

Step 805 determines a density field from the positions of the hair particles. In an embodiment, the hair density field is determined in a similar manner as the target hair density field in step 610, using the positions of hair particles in a rest or default pose. FIGS. 9A-9B illustrate an example application of a method for determining normal vectors for shading simulated hairs according to an embodiment of the invention. FIG. 9A illustrates an example hair density field 900 representing the density of hair particles in a rest position.

Step 810 generates a signed distance function field from the hair density field. A signed distance function is a scalar volumetric function that represents for any given point in space, the distance from that point to the nearest surface. Negative signed distance function values indicate that a point is inside the hair volume, while a positive value indicates that a point is outside the hair volume. To determine a signed distance function field, a hair surface is defined at a specific hair density value. Portions of the hair density field having this hair density value are defined as part of the hair surface. For example, the hair surface can be defined at the locations where the hair density is half the density of the fully dense hair interior. In further embodiments, the user can specify the hair density value that defines the location of the hair surface. In an embodiment, interpolation can be used to determine the location of the hair surface in regions between adjacent voxel vertices having density values surrounding the surface hair density value. In a further embodiment, the hair surface is defined using the specified hair density value in conjunction with a marching tetrahedron algorithm or any other algorithm for extracting a surface from a scalar field.

Once the hair surface is defined, the signed distance function field can be determined for all of the voxel vertices. In an embodiment, the differential equation $|\nabla S| = 1$ with $S=0$ at the hair surface is solved to define the signed distance function field, where S is the signed distance function. FIG. 9B illustrates the surface 905 of a signed distance function field 910.

Step 815 determines normal vectors to be associated with each hair particle from the signed distance function field. In an embodiment, each portion of a hair, such as a hair particle or alternatively a control point of the geometric model of the hair, is projected onto the hair surface. The normal vector of the hair surface at this projected location is then used as the normal vector for this portion of the hair. In another embodiment, rather than projecting the hair onto the hair surface, the normal vector of a hair particle or control point at a given location is defined to be the gradient of the signed distance function field, S, at this location.

As the normal vectors determined in step 815 are derived from a density field of the hair in a rest position, these normal vectors must be updated as the set of hairs move or are posed into different positions. Step 820 updates the normal vectors associated with the set of hairs. In an embodiment, the signed distance function field is updated as hairs move, and new normal vectors are determined from the updated signed distance function field.

In an alternate embodiment, step 820 transforms normal vectors from the rest pose of the set of hairs to new orientations in accordance with the deformations of the set of hairs from their rest pose to their current positions. Each normal vector associated with a hair in a rest pose is assigned to a local coordinate frame. As the hair moves, these coordinate frames will also move, and step 820 can transform each normal vector using its local coordinate frame. In an embodiment, to determine the transformation of local coordinate frames associated with a hair, step 820 starts with a local coordinate frame at the root of the hair and thus fixed in position with respect to the head. Moving along the length of the hair from the root, this frame is propagated using parallel transport frames between successive control vertices. These frames compute the minimum rotation to account for the change in hair direction between two consecutive control points or particle along the hair. The minimum rotations computed for each control point or particle during this process are then used to reorient their respective normal vectors.

Figure 10:
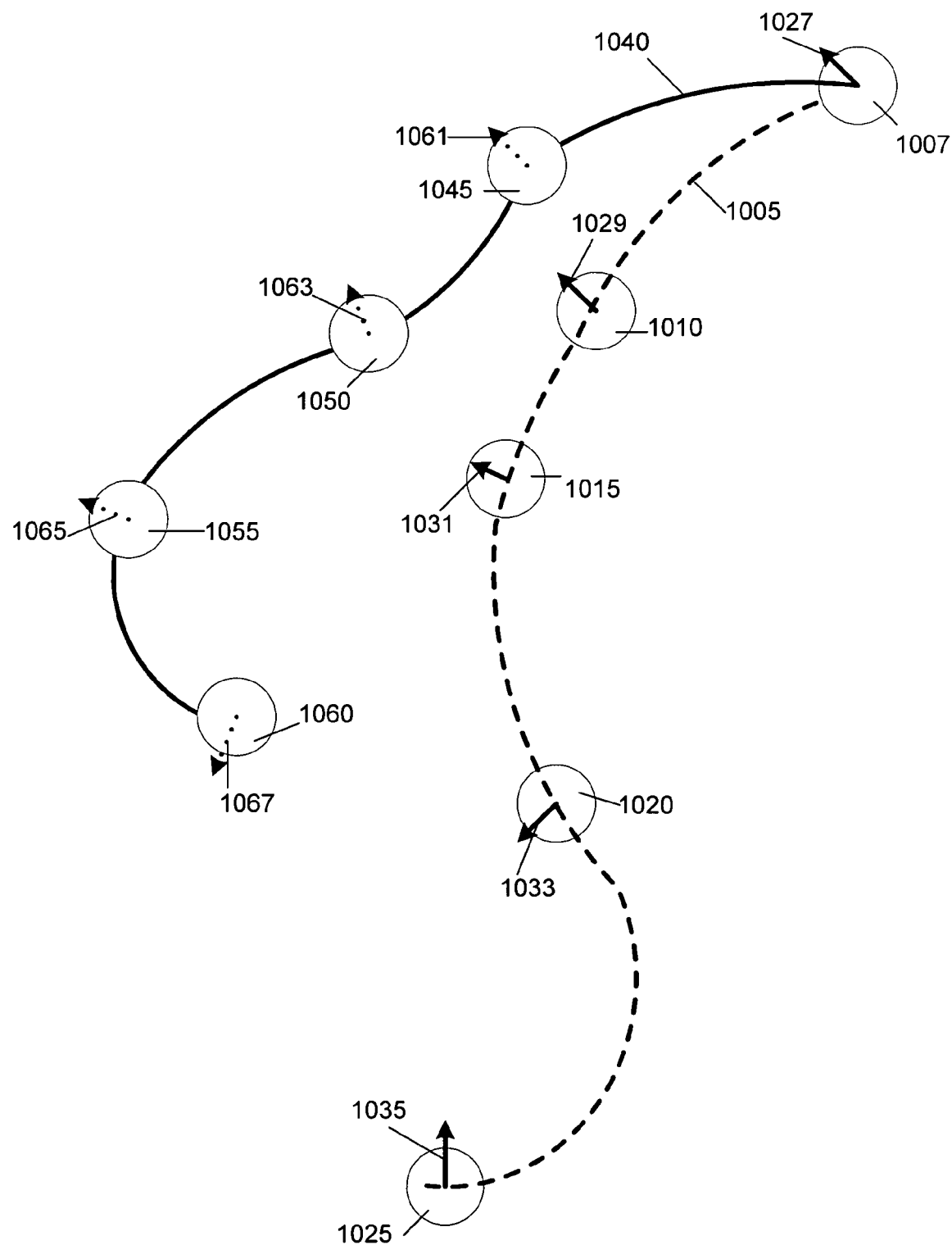
FIG. 10 illustrates an example application of a method for updating normal vectors for shading simulated hairs according to an embodiment of the invention.

FIG. 10 illustrates a transformation of normal vectors for an example hair according to an embodiment of the invention. An example hair in a rest pose 1005 includes hair control points at rest positions 1007, 1010, 1015, 1020 and 1025. As described above, these hair control points are assigned normal vectors 1027, 1029, 1031, 1033, and 1035, respectively. When the example hair is moved into a new pose 1040, the hair control points at rest positions 1010, 1015, 1020 and 1025 assume new positions 1045, 1050, 1055, and 1060, respectively. The root hair control point remains at the same position 1007. Applying the coordinate transformations determined as described above, normal vectors 1029, 1031, 1033, and 1035 are transformed to the orientations 1061, 1063, 1065, and 1067, respectively.

Returning to method 800, step 825 renders the set of hairs in their current positions using their associated normal vectors to determine at least a portion of the illumination on each hair. In further embodiments, as hairs are moved to additional poses, steps 820 and 825 are repeated to generate additional images.

In the foregoing description, the invention has been described with reference to specific exemplary embodiments thereof. Many changes or modifications are readily envisioned. It is envisioned that a great number of shaders currently compatible with RenderMan® or other rendering systems could be used in embodiments of the present invention. Further, the objects that are rendered into images according to the above techniques may be recorded onto a physical media such as optical media (e.g. DVD, CD-ROM), film, magnetic media (e.g. hard disk, video tape), or the like. A user may view the rendered images with a computer monitor, television, projection device, or other device.

Embodiments of the present invention may be applied to any number of rendering/simulation platforms and for a variety of purposes. For example, embodiments may be use on engineering workstations for development purposes, on visualization systems for artists and animators, in a cluster computing or renderfarm configuration for final production, and the like.

In the above disclosure, any resolution for the voxel grids may be used. For example a 10 by 10 by 10 voxel grid can be used for many embodiments of the invention. In further embodiments, a higher resolution grid can be used for the rendering-related aspects of the invention, as compared with the simulation aspects of the invention, to provide a higher degree of visual fidelity and prevent the appearance of unwanted visual artifacts.

Further embodiments can be envisioned to one of ordinary skill in the art in light of the present disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for determining the collective attributes of a set of hairs, the method comprising:
   determining a volumetric representation of a hair simulation model, wherein the volumetric representation comprises a plurality of volume elements representing the space occupied by the hair simulation model, wherein at least a first portion of the volume elements each encompasses space including at least two non-colliding hairs of the hair simulation model;
   determining a set of collective attribute values for the volumetric representation, wherein at least a portion of the set of collective attribute values each represent a collective attribute based on attributes of all of the hairs encompassed by one of the plurality of volume elements, wherein the collective attribute values of the first portion of the volume elements are based on at least non-zero numerical contributions from their respective encompassed two non-colliding hairs of the hair simulation model; and
   determining a set of optical properties of the set of hairs from the set of collective attribute values.

2. The method of claim 1, wherein the set of optical properties includes a set of normal vectors associated with an approximation of a surface of the set of hairs.

3. The method of claim 1, wherein the volumetric representation includes a first set of sample points each including an attribute value representing the density of the adjacent portion of the hair simulation model.

4. The method of claim 3, wherein determining the set of collective attribute values for the volumetric representation includes defining a hair surface from the set of attribute values of the first set of sample points.

5. The method of claim 4, wherein determining the set of optical properties of the set of hairs from the set of collective attribute values includes:
   projecting at least a portion of one of the set of hairs on the hair surface at a point; determining a normal vector for the hair surface at the point; and
   assigning the normal vector to the portion of the one of the set of hairs.

6. The method of claim 4, wherein determining the second set of target collective attribute values for the volumetric representation includes:
   determining a signed distance function value relative to the hair surface for each of the first set of sample points.

7. The method of claim 6, wherein determining the set of optical properties of the set of hairs from the set of collective attribute values includes:
   determining a point in the volumetric representation corresponding to a position of at least a portion of one of the set of hairs;
   determining a gradient of the signed distance function values of the first set of sample points at the point; and
   assigning the gradient to the portion of the one of the set of hairs as a normal vector.

8. The method of claim 1, wherein the position of at least the portion of one of the set of hairs is associated with a default pose of the set of hairs and determining the set of optical properties of the set of hairs from the set of collective attribute values includes:
   transforming the normal vector assigned to the portion of the hair to a new orientation in accordance with the deformation of the hair from its default position to a current position.

9. The method of claim 8, wherein transforming the normal vector assigned to the portion of the hair to a new orientation includes:
   using a set of parallel transport frames associated with the hair to define a series of transformations from a root of the hair to the portion of the hair; and
   applying the series of transformations to the normal vector.

10. The method of claim 1, further comprising:
    simulating the behavior of the hair simulation model under influence of at least a set of forces.

11. The method of claim 1, wherein the volumetric representation of the hair simulation model is a voxel grid.

12. The method of claim 1, wherein the hair simulation model includes a set of hair particles.

13. A computer readable medium including a set of instructions that is executable by a computer comprising:
    determining a volumetric representation of a hair simulation model, wherein the volumetric representation comprises a plurality of volume elements representing the space occupied by the hair simulation model, wherein at least a first portion of the volume elements each encompasses space including at least two non-colliding hairs of the hair simulation model;

determining a set of collective attribute values for the volumetric representation, wherein at least a portion of the set of collective attribute values each represent a collective attribute based on attributes of all of the hairs encompassed by one of the plurality of volume elements, wherein the collective attribute values of the first portion of the volume elements are based on at least non-zero numerical contributions from their respective encompassed two non-colliding hairs of the hair simulation model; and determining a set of optical properties of the set of hairs from the set of collective attribute values.

14. The computer readable medium of claim 13, wherein the set of optical properties includes a set of normal vectors associated with an approximation of a surface of the set of hairs.

15. The computer readable medium of claim 13, wherein the volumetric representation includes a first set of sample points each including an attribute value representing the density of the adjacent portion of the hair simulation model.

16. The computer readable medium of claim 15, wherein determining the set of collective attribute values for the volumetric representation includes defining a hair surface from the set of attribute values of the first set of sample points.

17. The computer readable medium of claim 16, wherein determining the set of optical properties of the set of hairs from the set of collective attribute values includes:

projecting at least a portion of one of the set of hairs on the hair surface at a point;

determining a normal vector for the hair surface at the point; and assigning the normal vector to the portion of the one of the set of hairs.

18. The computer readable medium of claim 16, wherein determining the second set of target collective attribute values for the volumetric representation includes:

determining a signed distance function value relative to the hair surface for each of the first set of sample points.

19. The computer readable medium of claim 18, wherein determining the set of optical properties of the set of hairs from the set of collective attribute values includes:

determining a point in the volumetric representation corresponding to a position of at least a portion of one of the set of hairs;

determining a gradient of the signed distance function values of the first set of sample points at the point; and assigning the gradient to the portion of the one of the set of hairs as a normal vector.

20. The computer readable medium of claim 19, wherein the position of at least the portion of one of the set of hairs is associated with a default pose of the set of hairs and determining the set of optical properties of the set of hairs from the set of collective attribute values includes:

transforming the normal vector assigned to the portion of the hair to a new orientation in accordance with the deformation of the hair from its default position to a current position.

21. The computer readable medium of claim 20, wherein transforming the normal vector assigned to the portion of the hair to a new orientation includes:

using a set of parallel transport frames associated with the hair to define a series of transformations from a root of the hair to the portion of the hair; and applying the series of transformations to the normal vector.

* * * * *